(12) United States Patent
Hwang et al.

(10) Patent No.: US 7,895,451 B2
(45) Date of Patent: Feb. 22, 2011

(54) INFORMATION RECORDING MEDIUM, RECORDING/REPRODUCING APPARATUS, AND RECORDING/REPRODUCING METHOD WITH WRITE-PROTECTION FUNCTION

(75) Inventors: Sung-hee Hwang, Suwon-si (KR); Kyung-goun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 953 days.

(21) Appl. No.: 11/580,192

(22) Filed: Oct. 13, 2006

(65) Prior Publication Data

US 2007/0091753 A1    Apr. 26, 2007

(30) Foreign Application Priority Data

Oct. 26, 2005    (KR) ................ 10-2005-0101491

(51) Int. Cl.
*G06F 21/00*    (2006.01)
(52) U.S. Cl. ...................... 713/193; 713/182
(58) Field of Classification Search ............... 380/270, 380/258; 713/193, 182; 369/53.21
See application file for complete search history.

(56) References Cited

U.S. PATENT DOCUMENTS

| | | | |
|---|---|---|---|
| 5,271,018 A | | 12/1993 | Chan |
| 5,339,319 A | | 8/1994 | Yamane et al. |
| 5,729,516 A | | 3/1998 | Tozaki et al. |
| 5,825,736 A | | 10/1998 | Kimura et al. |
| 5,917,908 A | * | 6/1999 | Takenaka et al. ............ 713/190 |
| 6,070,799 A | | 6/2000 | Ashe |
| 6,157,606 A | | 12/2000 | Inazawa et al. |
| 6,243,796 B1 | | 6/2001 | Otsuka |
| 6,351,447 B1 | | 2/2002 | Takagi et al. |
| 6,418,100 B1 | | 7/2002 | Park et al. |
| 6,496,455 B1 | | 12/2002 | Takagi et al. |
| 6,549,499 B2 | | 4/2003 | Takagi et al. |
| 6,556,522 B1 | | 4/2003 | Ko et al. |
| 6,560,177 B2 | | 5/2003 | Ko et al. |
| 6,611,483 B1 | | 8/2003 | Park et al. |

(Continued)

FOREIGN PATENT DOCUMENTS

EP    0 812 194 B1    9/1996

(Continued)

OTHER PUBLICATIONS

Kjoernes, Thomas. "File Allocation Table How it Seems to Work". May 11, 2000. http://web.archive.org/web/20060206182805/http:no.net/tkos/info/fat.html.

(Continued)

*Primary Examiner*—Gilberto Barron, Jr.
*Assistant Examiner*—Samson Lemma
(74) *Attorney, Agent, or Firm*—NSIP Law

(57) ABSTRACT

An information recording medium for use in a recording/reproducing apparatus and a recording/reproducing method includes a first area having a write-protection information for preventing writing of data to the information recording medium, and a second area having a status information field including status information of the first area, wherein recording the status information field for updating status information of the first area in the second area is permitted even when information for preventing the writing of data to the whole information recording medium is set in the write-protection information.

15 Claims, 7 Drawing Sheets

U.S. PATENT DOCUMENTS

| | | |
|---|---|---|
| 6,862,256 B2 | 3/2005 | Lee et al. |
| 2002/0007437 A1* | 1/2002 | Chan et al. ............ 711/111 |
| 2002/0067673 A1 | 6/2002 | Ko et al. |
| 2002/0075792 A1 | 6/2002 | Ko et al. |
| 2002/0097665 A1 | 7/2002 | Ko et al. |
| 2002/0110058 A1* | 8/2002 | Hamada et al. ......... 369/47.13 |
| 2002/0145966 A1 | 10/2002 | Hirotsune et al. |
| 2002/0176341 A1 | 11/2002 | Ko et al. |
| 2003/0072236 A1 | 4/2003 | Hirotsune et al. |
| 2003/0095480 A1 | 5/2003 | Ko et al. |
| 2003/0123348 A1 | 7/2003 | Ozaki |
| 2003/0123846 A1 | 7/2003 | Hamada et al. |
| 2005/0083740 A1 | 4/2005 | Kobayashi |

FOREIGN PATENT DOCUMENTS

| | | |
|---|---|---|
| EP | 0 813 194 | 12/1997 |
| EP | 0 965 988 | 12/1999 |
| EP | 1 313 108 | 5/2002 |
| JP | 10-92149 | 4/1998 |
| JP | 11-265507 | 9/1999 |
| JP | 2000-11522 | 1/2000 |
| JP | 2004-14088 | 4/2004 |
| KR | 2000-5588 | 1/2000 |
| KR | 2000-31791 | 6/2000 |
| KR | 2000-33180 | 6/2000 |
| TW | 200421093 | 10/2004 |
| TW | I226611 | 1/2005 |
| TW | I233608 | 6/2005 |

OTHER PUBLICATIONS

European Search Report dated Feb. 6, 2007 of the European Patent Office.

Office Action dated Nov. 30, 2007 of the Singapore Patent Application No. 200607300-1.

DRX-510 UL, High Performance External Dual RW DVD/CD Recorder for Microsoft Windows Operating Systems (Sony Electronics Inc. 2003).

DRU-510A High Performance Dual RW DVD/CD Recorder for Microsoft Windows 98SE, Windows Millennium Edition, Windows 2000, and Windows XP Operating Systems (Sony Electronics Inc. 2003).

Taiwanese Preliminary Notice of the First Office Action issued on Apr. 29, 2010, in corresponding Taiwanese Application No. 095138944 (7 pages).

Japanese Office Action issued on Nov. 24, 2010, in corresponding Japanese Patent Application No. 2006-290450 (3 pages).

* cited by examiner ical application. In such cases, the
INFORMATION RECORDING MEDIUM, RECORDING/REPRODUCING APPARATUS, AND RECORDING/REPRODUCING METHOD WITH WRITE-PROTECTION FUNCTION

CROSS-REFERENCE TO RELATED APPLICATION

This application claims the benefit of Korean Patent Application No. 2005-0101491, filed on Oct. 26, 2005 in the Korean Intellectual Property Office, the disclosure of which is incorporated herein in its entirety by reference.

BACKGROUND OF THE INVENTION

1. Field of the Invention

Aspects of the present invention relate to a disc, and more particularly, to an information recording medium, a recording/reproducing apparatus, and a recording/reproducing method with write-protection function.

2. Description of Related Art

In line with the developments of optical disc technologies and semiconductor technologies, new functions are frequently added to optical systems using drive systems for operating optical discs, after the specifications of the optical systems have been initially established. In such cases, the initially established specifications must be updated.

If a previous specification is called an "old specification" and an updated specification obtained by adding a new function is called a "new specification", a disc according to the old specification is manufactured to be operable in a drive system according to the old specification. In contrast, a disc according to the new specification is manufactured to be operable in a drive system according to the new specification.

The old specification and the new specification may or may not be recording/reproducing compatible due to the newly added function. The fact that the two specifications are recording/reproducing compatible means that the disc according to the old specification can be used in the drive systems according to both the old specification as well as the new specification. Additionally, the disc according to the new specification can be used in the drive system according to both the new specification and the old specification. In this way, in order to ensure the recording/reproducing compatibility between the two specifications when a new function is added to the old specification to create the new specification, when a disc according to the new specification is loaded into a drive system according to the old specification, the drive system according to the old specification should be able to operate according to the new function. Allowance for such future new functions and new specifications should be accounted for at the time of establishing the old specification.

More specifically, in order to ensure the recording/reproducing compatibility among a series of specifications, such possibility should be accounted for at the time of establishing each of the specifications. When a new specification is established by adding a new function to an old specification and information regarding operations corresponding to the new function that a drive system according to the old specification should perform are stored in a disc, the operations for the new function should be performed even when a new disc having the newly added function is loaded onto the drive system according to the old specification. In this regard, it is possible to develop a write-protection function for data ensuring the recording/reproducing compatibility between different specifications.

When a write-protection function is embedded in a disc A which is loaded onto a drive system A by the use of the data for recording and reproducing compatibility, as shown in FIG. 1, control information for accessing the data for recording and reproducing compatibility in which the write-protection function is set must be recorded in a prescribed area of the disc A. However, since the write-protection function is already set, it is impossible to write data to the information recording medium any more. Accordingly, when the disc A is ejected from the drive system A and is reloaded onto the drive system A or is loaded onto another drive system, the drive system obtains only the previous control information from the information recording medium since recently updated control information is not recorded in the information recording medium. As a result, there is no way to recognize that the write-protection function is set to the medium. Therefore, there is a problem that the disc A is modified or changed contrary to the user's intention.

SUMMARY OF THE INVENTION

Aspects of the present invention provide an information recording medium, a recording/reproducing apparatus, and a recording/reproducing method having a write-protection function.

According to an aspect of the present invention, there is provided an information recording medium including a first area having a write-protection information for preventing writing of data to the information recording medium, and a second area having a status information field including status information of the first area, wherein recording the status information field for updating status information of the first area in the second area is permitted even when information for preventing the writing of data to the whole information recording medium is set in the write-protection information.

According to an aspect of the present invention, the status information of the first area includes position information about where the write-protection information is recorded or validity information of each record unit block where the write-protection information is recorded.

According to an aspect of the present invention, the write-protection information includes ON/OFF information indicating whether the write-protection is set or not, and the write-protection information includes password ON/OFF information indicating whether or not a password is set for write-protection, wherein when the password is set to a specific value in a state where the password is ON and the write-protection is ON, a function for preventing the writing of data to the whole information recording medium is set.

According to an aspect of the present invention, the status information field includes ON/OFF information indicating whether the write-protection is set or not, and the write-protection information includes password ON/OFF information indicating whether or not a password is set for write-protection, wherein when the password is set to a specific value in a state where the password is ON and the write-protection is ON, a function for preventing the writing of data to the whole information recording medium is set.

According to an aspect of the present invention, the write-protection information is stored in Access Control Data (ACD) and the status information field is stored in Disc Definition Structure (DDS) or Temporary (TDDS).

According to an aspect of the present invention, the writing of data to the information recording medium is prevented after the recording of the status information field for updating the status information of the first area into the second area is performed and the status information field is recorded in the second area.

According to another aspect of the present invention, there is provided a recording/reproducing apparatus for recording/reproducing data in/from an information recording medium, the apparatus including a writing/reading unit writing/reading data to/from the information recording medium; and a control unit controlling the writing/reading unit to record a write-protection information for preventing writing of data to the information recording medium in a first area of the information recording medium and to record a status information field including status information of the first area in a second area of the information recording medium, wherein the control unit permits the recording of the status information field for updating the status information of the first area in the second area, even when information for preventing the writing of data to the whole information recording medium is set in the write-protection information.

According to another aspect of the present invention, there is provided a method of recording/reproducing data in an information recording medium, the method including recording a write-protection information for preventing writing of data to the information recording medium in a first area of the information recording medium and recording a status information field that includes that status information of the first area in a second area of the information recording medium; and permitting the recording of the status information field for updating the status information of the first area in the second area, even when information for preventing the writing of data to the whole information recording medium is recorded in the write-protection information.

BRIEF DESCRIPTION OF THE DRAWINGS

The above and other features and/or advantages of the present invention will become more apparent and more readily appreciated by describing in detail exemplary embodiments thereof with reference to the accompanying drawings in which.

DETAILED DESCRIPTION OF THE EMBODIMENTS

Figure 1:
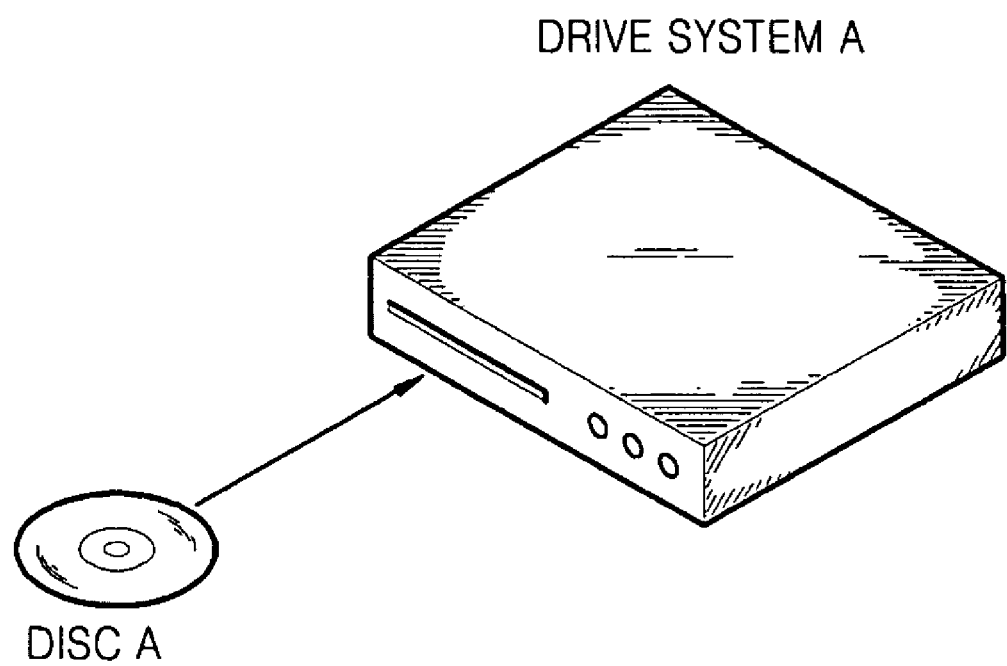
FIG. 1 is a reference diagram for explaining the problems in setting a write-protection function to an information recording medium.

The attached drawings for illustrating exemplary embodiments of the present invention are referred to in order to gain a sufficient understanding of the present invention, the merits thereof, and the objectives accomplished by the implementation of the present invention. In the accompanying drawings, like reference numerals refer to the like elements throughout. The embodiments are described below in order to explain the present invention by referring to the figures.

Figure 2:
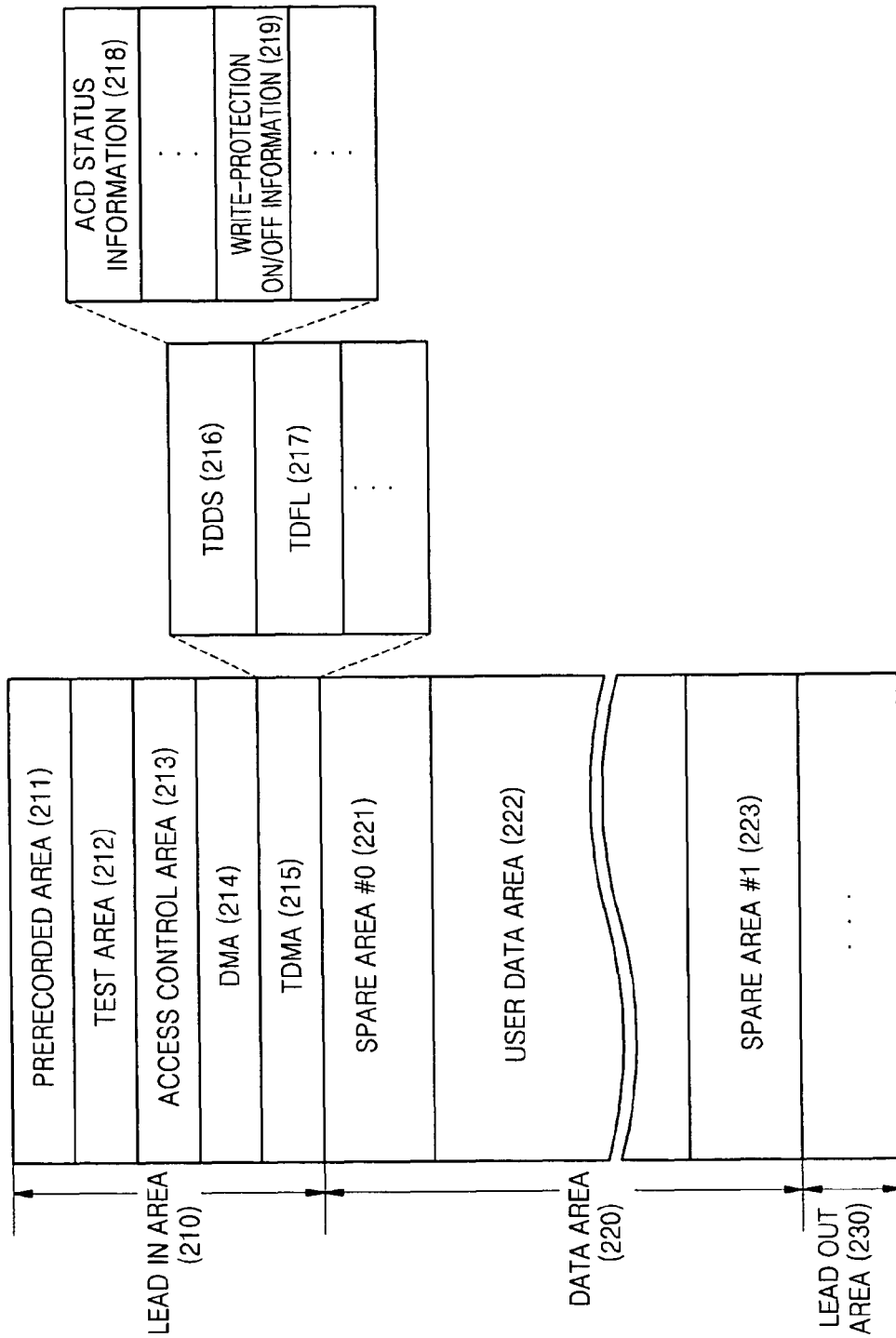
FIG. 2 illustrates an exemplary layout of a write-once information recording medium according to an embodiment of the present invention.

FIG. 2 illustrates an exemplary layout of a write-once information recording medium 200 according to an embodiment of the present invention. Referring to FIG. 2, the information recording medium 200 includes a lead in area 210, a data area 220, and a lead out area 230. The lead in area 210 includes a prerecorded area 211 in which prescribed data is recorded in advance when the information recording medium 200 is manufactured and which is used for reproducing purposes only. The lead in area 210 also includes a recordable area where recording and changing of data is possible.

The data area 220 includes a spare area #0 221, a user data area 222, and a spare area #1 223. The user data area 222 is an area where user data is recorded. The spare area #0 221 and the spare area #1 223 are for recording a replacement block in order to replace a defect block generated in the user data area 222. While not required in all aspects, the spare areas 221, 223 are assigned to the data area 220 at the time of initializing or re-initializing the information recording medium 200.

The recordable area in the lead in area 210 includes a test area 212, an access control area 213, a defect management area (DMA) 214, and a temporary defect management area (TDMA) 215. The test area 212 is an area for testing a recording power and other parameters for recording data on the information recording medium 200 in an optimal recording condition. The access control area 213 is an area for recording information that allows a new drive system (i.e., a drive system according to a new specification) to control the information recording medium 200. In other words and as will be described with reference to FIG. 3, the access control area 213 stores individual information 320 about a prescribed function and common information 310 which enables a new drive system to access the information recording medium 200.

The defect management area 214 is an area for recording information previously recorded in the temporary defect management area 215 in an orderly manner when the information recording medium 200 is finalized. The temporary defect management area 215 is an area for temporarily recording information about defects generated in the user data area 222. The temporary defect management area (TDMA) 215 includes a temporary disc definition structure (TDDS) 216 and a temporary defect list (TDFL) 217. The TDDS 216 and the TDFL 217 are collectively referred to as a temporary defect management structure.

The TDFL 217 stores information about defects in the user data area 222. For example, the TDFL 217 includes address information of a defect block in the user data area 222, address information of a replacement block that replaces the defect block, status information about the defect, and the like. The TDDS 216 stores information about management of the information recording medium 200. According to an embodiment of the present invention, the TDDS 216 includes access control data (ACD) status information 218 and write-protection ON/OFF information 219.

The ACD status information 218 is information about the validity of access control data blocks included in the access control area 213. Examples of validity information may be position information of the access control data blocks, or information about the validity of each access control data block included in the access control area 213. By recording the status information 218 of the access control data block in the TDDS 216 and managing the status information, it is possible to effectively manage the access control data. In reproducing the ACD block, when the information recording medium 200 is loaded onto a drive, the drive can recognize from the status information about each ACD block in a disc definition structure (DDS) the position where a valid ACD block is recorded, and reproduce the valid ACD blocks.

The write-protection ON/OFF information 219 shows whether or not write-protection is set to a specific area of the information recording medium 200. By way of example, the write protection can be for only the user data area 222 or the entire information recording medium 200.

Figure 3:
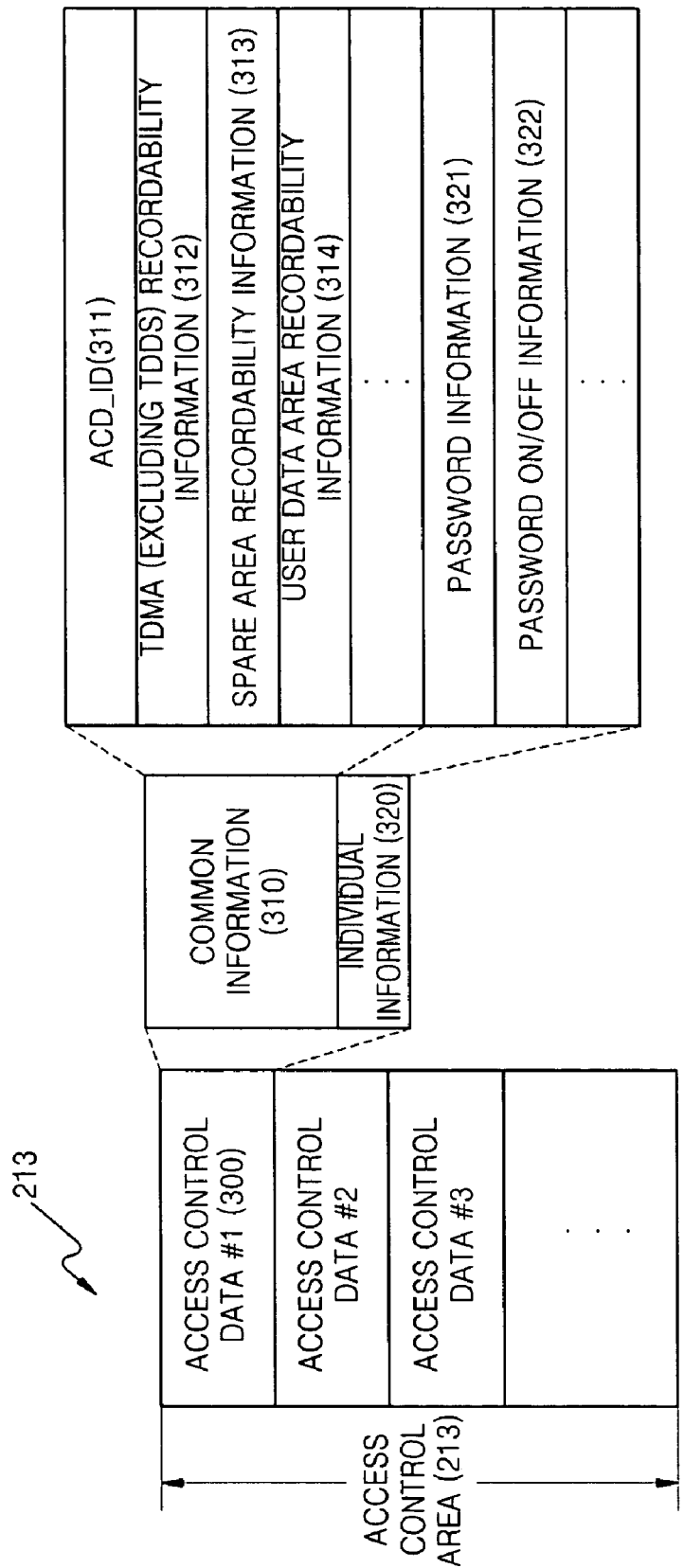
FIG. 3 illustrates a detailed exemplary structure of an access control area depicted in FIG. 2.

FIG. 3 illustrates a detailed exemplary structure of the access control area 213 depicted in FIG. 2. Referring to FIG. 3, the access control area 213 includes access control data #1 300, access control data #2, access control data #3, and so on.

Each access control data 300 includes common information 310 that can be commonly recognized for the access control to the information recording medium 200 not only by a drive system according to an existing specification but also by a drive system according to a new specification having a newly added function. Each access control data 300 also includes individual information 320 that can be recognized only by a drive system which recognizes the function of the access control data.

More specifically, the access control data #1 300 includes the individual information 320 and the common information 310 about "function 1". While not specifically shown, the access control data #2 includes individual information and common information about a "function 2", and the access control data #3 includes individual information and common information about a "function 3". As such, different access control data includes individual information and common information about a corresponding function to allow the recording medium 200 to be used in drives compatible with the old specification as well as drives compatible with the new specification.

The access control data #1 300 includes individual information 310 and common information 320. While not required in all aspects, the common information 310 shown in FIG. 3 includes an ACD_ID 311 which is an identifier for identifying the access control data (ACD). The common information 310 TDMA includes recordability information 312 which shows the possibility of recording in the TDMA 215 except for the TDDS 216. The common information 310 includes spare area recordability information 313 which shows the possibility of recording in the spare areas. The common information 310 includes user data area recordability information 314 which shows the possibility of recording in the user data area 222. The reason of excluding the TDDS 216 from the TDMA 215 is that changes in the status information 218 due to the updates of the ACD area 213 cannot be reflected in the TDDS 216 since the status information 218 of the ACD is stored in the TDDS 216.

A drive system can determine whether the ACD is related to a function that can be recognized or not by identifying the ACD_ID 311. Even when the drive system cannot recognize the ACD_ID 311, the drive system can perform a minimal suitable operation corresponding to the function that cannot be recognized by the drive system by identifying the content contained in the common information 310.

The individual information 320 includes information corresponding to a function of the access control data. By way of example, the information corresponding to the function of the access control data includes setting information such as setting values, which a user, a file system drive, a manufacturer of a prescribed recording or reproducing application or drive, a command set, or the like sets in order to use the function of the access control data with a certain intention. Referring to the example shown in FIG. 3 the setting information of the individual information 320 includes password information 321 and password ON/OFF information 322. Here, the password information 321 literally means a password. The password ON/OFF information 322 indicates whether a password is set or not. In a case where the password ON/OFF information is not set even when a certain value is stored in the password information, a recording/reproducing apparatus understands that no password is set. In a case where the password ON/OFF information is set, the recording/reproducing apparatus uses the password set in the password information 321. The reason of preparing the password is to prevent a user from changing the setting condition at will after the user sets the write-protection function.

All recording/reproducing apparatuses can identify the set values from a write-protection flag in the TDDS 216, but not all recording/reproducing apparatuses can recognize a write-protection ACD where the password information 321 and the password ON/OFF information 322 are stored. Therefore, when the information recording medium 200 having write-protection ACD including a password is loaded into a recording/reproducing apparatus that cannot recognize the write-protection ACD, the recording/reproducing apparatus may perform an operation related to the write-protection function according to the values set in the common information field 310 of the write-protection ACD recorded in the information recording medium 200 and the values set for the write-protection flag in the TDDS 216.

Meanwhile, a function of preventing writing of data to the whole information recording medium can be also realized by setting the password information 321 to a certain value that is specifically determined in advance. In this case, the write-protection ON/OFF information 219 of the TDDS 216 is set in a write-protection ON state, and moreover, the password ON/OFF information 322 of the access control data is set in a password ON state.

Figure 4:
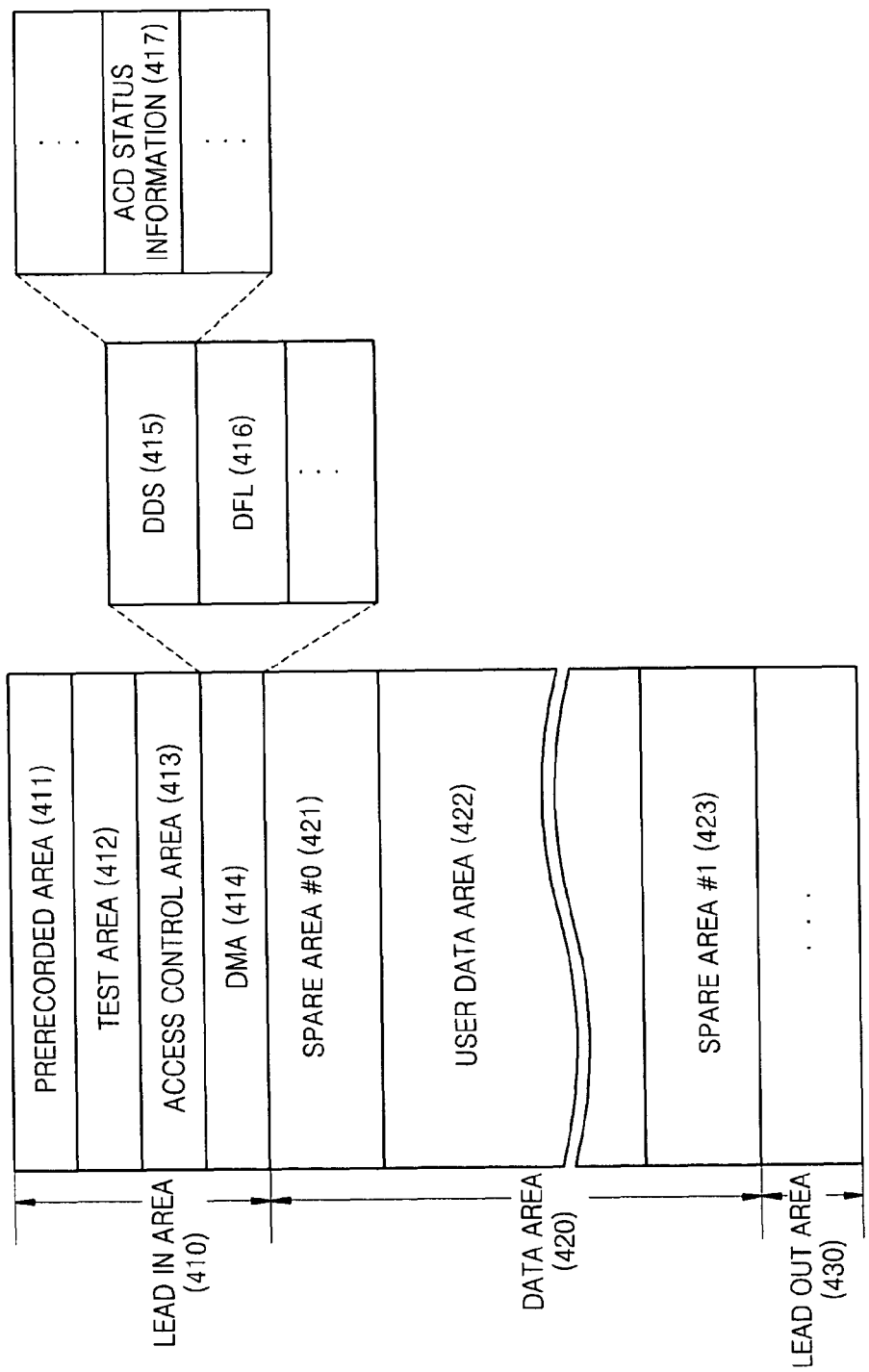
FIG. 4 is a diagram depicting an exemplary layout of a rewritable information recording medium according to an embodiment of the present invention.

FIG. 4 illustrates an exemplary layout of a rewritable information recording medium 400 according to an embodiment of the present invention. Referring to FIG. 4, the information recording medium 400 includes a lead in area 410, a data area 420, and a lead out area 430 arranged in a successive manner. The lead in area 410 includes a prerecorded area 411 where prescribed data is recorded in advance when the information recording medium 400 is manufactured and which is used for reproducing purposes only. The lead in area 410 also includes a recordable area where recording and changing of data is possible.

The data area 420 includes a spare area #0 421, a user data area 422, and a spare area #1 423. The user data area 422 is an area where user data is recorded. The spare area #0 421 and the spare area #1 423 are for recording a replacement block for replacing a defect block occurred in the user data area 422. While not required in all aspects, the spare areas #0 421 and #1 423 are assigned to the data area 420 at the time of initializing or re-initializing the information recording medium 400.

Information about the information recording medium 400 is recorded in the prerecorded area 411 at the time of manufacturing the information recording medium 400. The recordable area in the lead in area 410 includes a test area 412, an access control area 413, and a defect management area (DMA) 414. The test area 412 is an area for testing a recording power and other parameters to write data to the information recording medium 400 in an optimal recording condition. The access control area 413 is an area for recording information which defines the operation of a new drive system. In other words and as described in detail with reference to FIG. 5, the access control area 413 stores individual information 520 about a prescribed function, and common information 510 which a drive system having no knowledge of the prescribe function to access control the information recording medium 400.

The defect management area 414 is an area for recording information about a defect which occurred in the user data area 422. The defect management area 414 includes a DDS 415 and a DFL 416. The DFL 416 is a defect list which stores information about defects occurred in the user data area 422. For example, the DFL 416 includes address information of a defect block occurred in the user data area 422, address information of a replacement block a spare area 421 or 423 that replaces the defect block, status information about the defect, and the like.

The DDS 415 is a disc definition structure which stores information about the management of the information recording medium 400. In other words, according to an embodiment of the present invention, the DDS 415 stores access control data (ACD) status information 417. The ACD status information 417 includes information about the validity of access control data blocks included in the access control area 413. Examples of validity information may be position information of the access control data blocks which store valid information, or information about the validity of each access control data block included in the access control area 413. By recording the status information 417 of the access control data (ACD) block in the DDS 415 and managing the status information 417, it is possible to effectively manage the ACD. In reproducing the ACD block when the information recording medium 400 is loaded into a drive, the drive can recognize from the status information 417 about each ACD block in the DDS 415 the position where a valid ACD block is recorded, and reproduce the valid ACD blocks.

Figure 5:
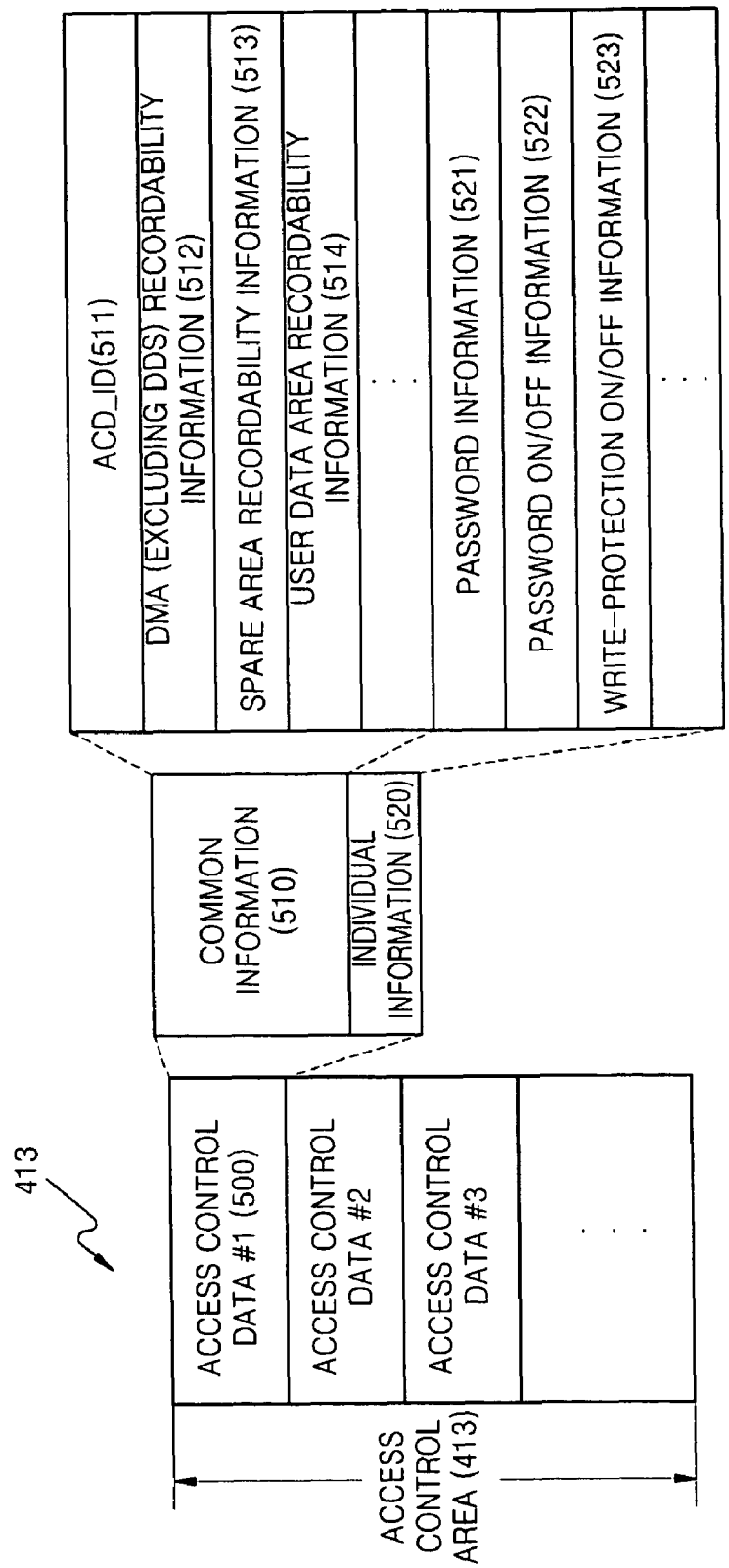
FIG. 5 illustrates a detailed exemplary structure of an access control area depicted in FIG. 4.

FIG. 5 illustrates a detailed exemplary structure of then access control area 413 depicted in FIG. 4. Referring to FIG. 5, the access control area 413 includes access control data #1 500, access control data #2, access control data #3, and so on. The function of the access control data in FIG. 5 is substantially identical to the function of the access control data in FIG. 3. Specifically, the access control data #1 500 includes common information 510 and individual information 520.

While not restricted thereto, common information 510 includes an ACD_ID 511 which is an identifier for identifying the access control data. The common information 510 includes DMA recordability information 512 which shows the possibility of recording the DMA except for the DDS 415. The common information 510 includes spare area recordability information 513 which shows the possibility of recording the spare area 421, 243. The common information 510 includes user data area recordability information 514 which shows the possibility of recording the user data area 422. The reason of excluding the DDS 415 from the DMA is that the changes in the status information 417 due to the updates of the ACD area 413 cannot be reflected in the DDS 415 since the status information 417 of the ACD is stored in the DDS 415.

The individual information 520 includes information corresponding to the function of the ACD, which can be settings information. Referring to the example shown in FIG. 5, according to an embodiment of the present invention, the individual information 520 includes password information 521, password ON/OFF information 522, and write-protection ON/OFF information 523. Here, the password information 521 is a password. The password ON/OFF information 522 indicates whether a password is set or not. When the password ON/OFF information is not set, even when a certain value is stored in the password information 521, a recording/reproducing apparatus understands that no password is set. When the password ON/OFF information is set, the recording/reproducing apparatus can use the password set in the password information 521. The reason for preparing the password is to prevent anyone from changing the setting condition at will after the user sets the write-protection function.

The write-protection ON/OFF information 523 shows whether or not write-protection is set to the information recording medium 400. In this example, the write-protection ON/OFF information 523 should be set in a write-protection ON state to indicate write protection is used, and the password ON/OFF information 522 of the ACD should be set in a password ON state to reflect the use of the password information 521. While not required in all aspects, a function of preventing writing of data to the whole information recording medium can be also realized by setting the password information 521 to a certain value that is specifically determined in advance. However, it is understood that this function can be otherwise implemented in the same or other ACD.

As described above, according to aspects of the present invention, in the case of the write-once information recording medium 200, the write-protection ON/OFF information 219 is included in the TDDS 216. In contrast, for the rewritable information recording medium 400, the write-protection ON/OFF information 523 is included in the ACD. However, the present invention is not necessarily limited to the above embodiments. For example, the write-once information recording medium 200 may contain the write-protection ON/OFF information 219 in the ACD, and the rewritable information recording medium 400 may contain the write-protection ON/OFF information 523 in the DDS 415.

When the write-protection function is to be set to the whole information recording medium 200, 400, the ACD must be updated since the password should be set to a specific value that is determined in advance in the write-protection ON state and the password ON state as described above. At this moment, the position of the updated ACD having valid information may be changed from the position of the ACD before the update. For example, the position where the ACD is recorded can be changed due to, for example, a defect in the case of the rewritable information recording medium 400. Moreover, the position of the ACD can be changed from the position of the ACD before the update due to the characteristics of the write-once in the case of the write-once information recording medium 200. Therefore, in order to record status information 218, 417 indicating that the position of the updated ACD having valid information is changed, the DDS 415 of the rewritable information medium 400 or the TDDS 216 of the write-once information medium 200 must be updated.

However, data is prevented from being written to the whole information recording medium 200 or 400 after recording the ACD, the DDS 415 or the TDDS 216 cannot not be updated. As a result, when the information recording medium 200 or 400 is ejected from a drive system and reloaded into the drive system, the ACD which is indicated by the DDS 415 or the TDDS 216 might have the information of the ACD before the update. Therefore, since the drive system reads out the information of the ACD before the update, the drive system cannot recognize from the ACD before the update that the writing of data to the whole information recording medium 200 or 400 is prevented. As a result, the information recording medium 200 or 400 may be misused regardless of the user's intention to prevent writing of data thereto. Therefore, the information on the information recording medium 200 or 400 can be modified or changed contrary to the user's intention.

In order to solve these problems, according to an aspect of the present invention, when the user sets the password of the ACD to a specific value for the purpose of preventing the writing of data to the whole information recording medium 200 or 400, when the position information of the updated ACD is changed after recording the updated ACD in the information recording medium 200 or 400, the ACD status information 218, 417 of the DDS 415 or the TDDS 216 is updated. Thus, the recording of the record unit block in the information recording medium 200 or 400 is permitted in order to indicate valid ACD status information 218, 417 about a record unit block containing the DDS 415 or the TDDS 216 where the ACD status information is stored. Thereafter, writing of data to the whole information recording medium 200 or 400 is prevented according to the write-protection function which is set in the updated ACD. Supplementary information other than the DDS 415 (or TDDS 216) can be contained in the record unit block that is exceptionally recorded in an aspect of the invention, but is not required in all aspects. While not limited thereto, the medium 200, 400 can be compact disc, Digital Versatile Disc, HD-DVD, Blu-Ray, or other optical and/or magnetic optical disc. Further, while shown as having the lead in area, data area, and lead out area, it is understood that additional areas can be defined in addition to or instead of the shown areas, and that the medium 200, 400 can have additional recording layers in other aspects of the invention.

Figure 6:
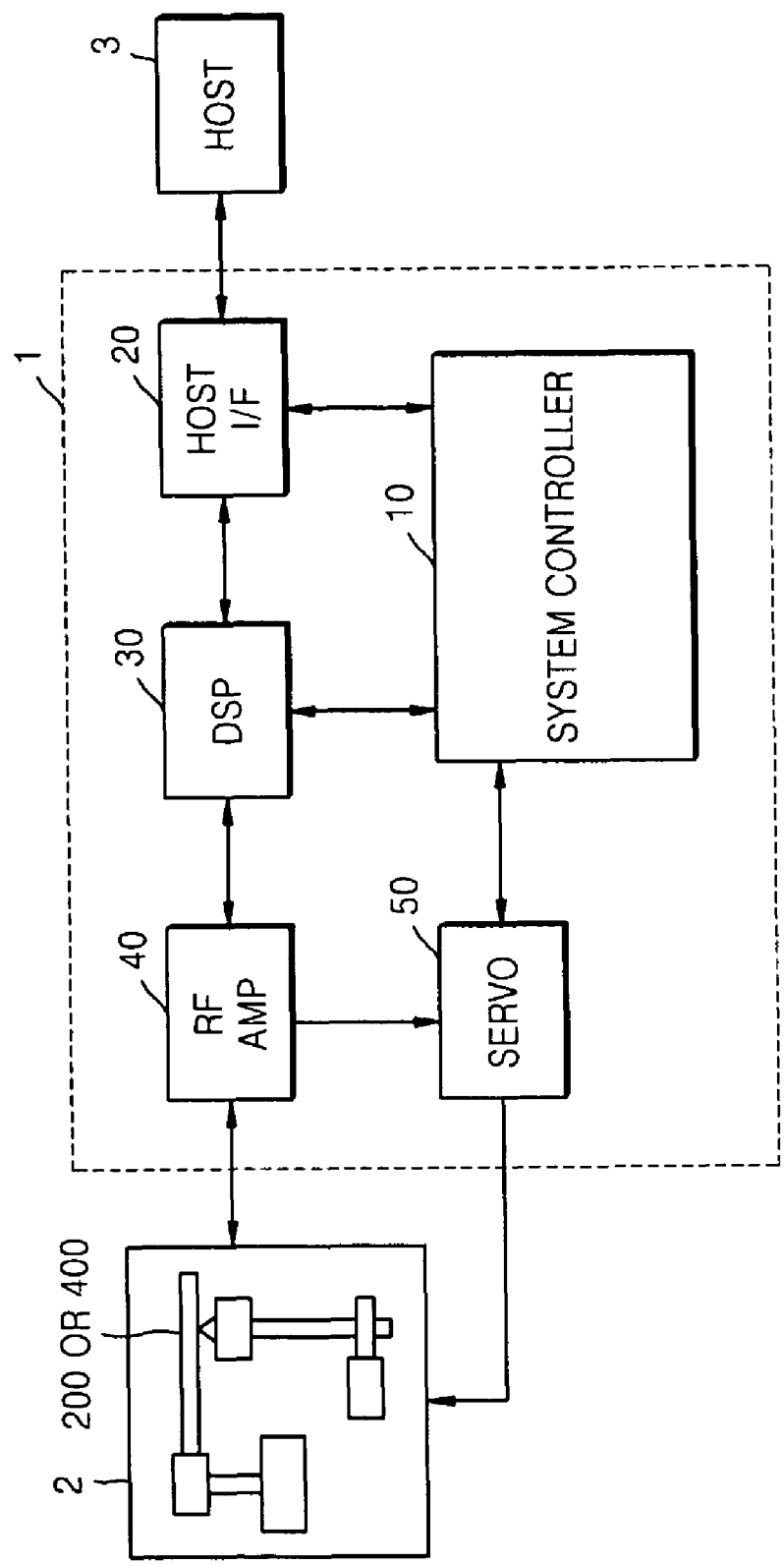
FIG. 6 is a schematic block diagram of a recording/reproducing apparatus according to an embodiment of the present invention.

FIG. 6 illustrates a schematic block diagram of a recording/reproducing apparatus according to an embodiment of the present invention. Referring to FIG. 6, the recording/reproducing apparatus includes a writing/reading unit 2 and a control unit 1. The writing/reading unit 2 includes a pickup and the like, and writes/reads data to/from an information recording medium, such as the write-once information recording medium 200 or the rewritable information recording medium 400.

The control unit 1 controls the writing/reading unit 2 to record data to the information recording medium according to a prescribed file system. In particular, even when the information for preventing writing of data to the whole information recording medium 200, 400 is recorded in the write-protection information field 219, 523 for preventing writing of data to the information recording medium 200, 400, the control unit 1 of according to an embodiment of the present invention permits updating of the status information 218, 417 in order to indicate that the status information 218, 417 is changed. In other words, the control unit 1 controls the writing/reading unit 2 to record the updated status information 218, 417.

In addition, the control unit 1 prevents writing of data to the whole information recording medium after updating the status information 218, 417. When the user happens to write data to the information recording medium 200, 400 in a state where the information recording medium 200, 400 is not ejected from the recording/reproducing apparatus, the recording/reproducing apparatus can recognize from the content of the write-protection information field 219, 523 stored in a memory (not shown) incorporated therein that the data recording is prevented in the information recording medium. Furthermore, when the information recording medium 200, 400 is ejected from the recording/reproducing apparatus and reloaded into the recording/reproducing apparatus, the control unit 1 can find the write-protection information field 219, 523 from the updated status information 218, 417 which is recorded in the information recording medium 200, 400, and recognize from the write-protection information field 219, 523 that the data recording is prevented in the information recording medium 200, 400.

While other constructions are possible, the shown control unit 1 includes a system controller 10, a host I/F 20, a digital signal processor (DSP) 30, an RF AMP 40, and a servo 50. During data recording, the host I/F 20 receives a write command from a host 3, and transmits the write command to the system controller 10. The system controller 10 controls the DSP 30 and the servo 50 so as to execute the write command received from the host I/F 20. For error correction processing, the DSP 30 adds supplementary data, such as parity data, to the data received from the host I/F 20. Then, the DSP 30 performs an ECC encoding to generate an ECC block, which is an error correction block, and modulates the ECC block in a predetermined manner. The RF AMP 40 converts the data output from the DSP 30 into an RF signal. The writing/reading unit 2 including the pickup, records the RF signal transmitted from the RF AMP 40 to the information recording medium 200, 400. The servo 50 receives a command that is necessary for the servo control from the system controller 10 and controls the pickup of the writing/reading unit 2.

During data reproducing, the host I/F 20 receives a read command from the host 3. The system controller 10 performs initialization processing that is necessary for the reproducing. The writing/reading unit 2 irradiates a laser beam onto the information recording medium, receives the laser beam reflected from the information recording medium, and outputs a light signal obtained from the reflected laser beam. The RF AMP 40 converts the light signal output from the writing/reading unit 2 into an RF signal, outputs the modulated data obtained from the RF signal to the DSP 30, and outputs a servo signal for control obtained from the RF signal to the servo 50. The DSP 30 demodulates the modulated data and outputs the data that is obtained through ECC error correction processing. In the meantime, the servo 50 receives the servo signal from the RF AMP 40, receives commands that are necessary for the servo control from the system controller 10 and performs servo control operations for the pickup. The host I/F 20 sends the data received from the DSP 30 to the host 3.

The recording/reproducing apparatus shown in FIG. 6 may include a separate recording device and a separate reproducing device, or may be realized as a single recording/reproducing apparatus as shown. Additionally, the apparatus shown in FIG. 6 need to record and/or reproduce both write once and rewritable media 200, 400 in all aspects of the invention.

Figure 7:
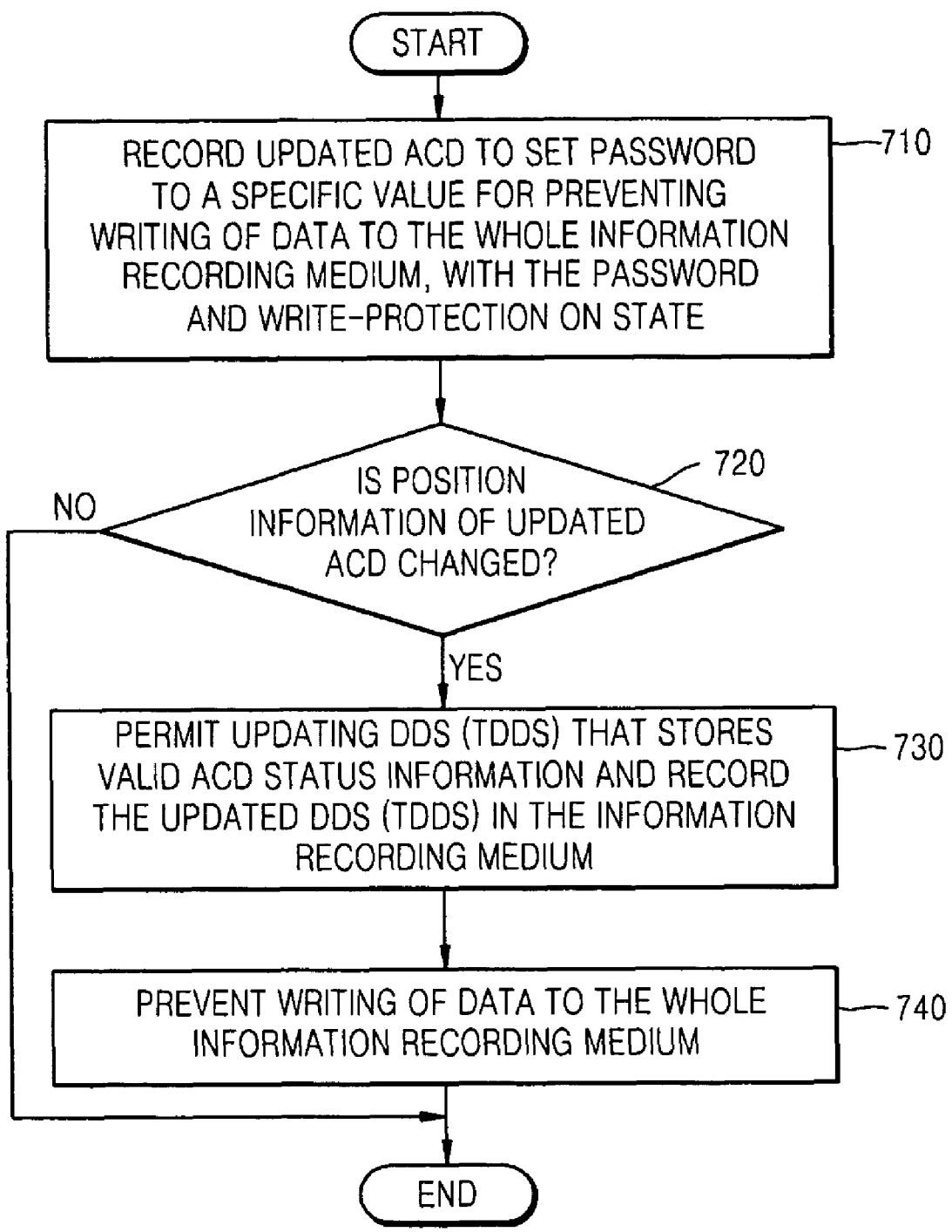
FIG. 7 is flowchart illustrating the process of setting a write-protection function to an information recording medium according to an embodiment of the present invention.

FIG. 7 illustrates a flowchart illustrating the process of setting a write-protection function to an information recording medium according to an embodiment of the present invention. In order to set a password to a specific value to prevent writing of data to the whole information recording medium, when the password and the write-protection are ON, updated ACD is recorded in an access control area of the information recording medium (710).

Next, it is determined that position information of the updated ACD is changed (720), and if not changed, the process stops. If the position information is changed, DDS (or TDDS) that stores valid ACD status information is updated and the updated DDS (or TDDS) is recorded in the information recording medium (730). As such, writing of data to the whole information recording medium is prevented (740). Additionally, if the password or other information so indicates in the ACD, only part of the information recording medium is write protected in other aspects of the invention.

The process or elements thereof described above can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While aspects of the present invention has been particularly shown and described with reference to exemplary embodiments thereof, it will be understood by those skilled in the art that various changes in form and details may be made therein without departing from the spirit and scope of the invention as defined by the appended claims and equivalents thereof. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A non-transitory optical information recording medium for use with a recording and/or reproducing apparatus, comprising:
   a first area having a write-protection information readable by the apparatus, which indicates whether writing of data to the information recording medium by the apparatus is prevented or not, and a second area having a status information field including status information about the write-protection information, wherein the status information field is updatable even if the write-protection information is set to prevent the writing of data to the whole information recording medium, and wherein:

the write-protection information includes:

write-protection ON/OFF information indicating to the apparatus whether the write-protection is set, and password ON/OFF information indicating to the apparatus whether a password is set for write-protection, and when the password is set to a specific value in a state where the password ON/OFF information is ON and the write-protection ON/OFF information is ON, a function for preventing the writing of data to the whole information recording medium is set.

2. The medium of claim 1, wherein the status information field includes validity information of each record unit block of the write-protection information.

3. The medium of claim 1, wherein: the second area includes the write-protection ON/OFF information.

4. The medium of claim 1, wherein:

the write-protection information is stored in an Access Control Data (ACD) area, and the status information field is stored in a Disc Definition Structure (DDS) or a Temporary DDS (TDDS).

5. The medium of claim 1, wherein, after recording the updated status information in the status information field of the second area, the writing of data I to the information recording medium is prevented while the status information field is permitted to be recorded in the second area.

6. A recording/reproducing apparatus for recording/reproducing data in/from an optical information recording medium having a first area and a second area, the apparatus comprising:

a writing/reading device for writing/reading data to/from the information recording medium; and a control unit controlling the writing/reading unit to record in the first area a write-protection information which indicates whether writing of data to the information recording medium is prevented or not, to record a status information field including status information about the write-protection information in a status information field in the second area, wherein, even if the write-protection information is set to prevent writing of data to the whole information recording medium, the control unit is able to update data in the status information field in the second area, and wherein:

the write-protection information includes:

write-protection ON/OFF information indicating whether write-protection is set, and password ON/OFF information indicating whether a password is set for write-protection, and when the password is set to a specific value and the password ON/OFF information is ON and the write-protection ON/OFF information is ON, a function for preventing the writing of data to the whole information recording medium is set.

7. The device of claim 6, wherein the control unit inserts in the status information field validity information of each record unit block of the write-protection information.

8. The device of claim 6, wherein: the second area includes the write-protection ON/OFF information.

9. The device of claim 6, wherein:

the write-protection information is stored in an Access Control Data (ACD) area, and the status information field is stored in a Disc Definition Structure (DDS) or a Temporary (TDDS).

10. The device of claim 6, wherein the control unit prevents the writing of data to the information recording medium after recording the updated status information in the status information field of the second area while permitting the status information field to be recorded in the second area.

11. A method of recording/reproducing data on/from an optical information recording medium, the method comprising:

recording, in a first area of the information recording medium, a write-protection information which indicates whether writing of data to the information recording medium is prevented or not;

recording, in a status information field in a second area of the information recording medium, status information about the write-protection information; and permitting updating data in the status information field of the second area even if the write-protection information is set to prevent the writing of data to the whole information recording medium, wherein:

the write-protection information includes:

write-protection ON/OFF information indicating whether the write-protection, and password ON/OFF information indicating whether a password is set for write-protection, and when the password is set to a specific value in a state where the password ON/OFF information is ON and the write-protection ON/OFF information is ON, a function for preventing the writing of data to the whole information recording medium is set.

12. The method of claim 11, wherein the status information field includes validity information about each record unit block of the write-protection information.

13. The method of claim 11, wherein: the second area includes the write-protection ON/OFF information.

14. The method of claim 11, wherein:

the write-protection information is stored in an Access Control Data (ACD) area, and the status information field is stored in a Disc Definition Structure (DDS) or a Temporary (TDDS).

15. The method of claim 11, further comprising preventing writing of data to the information recording medium after the recording the updated status information in the status information field of the second area while allowing recording in the second area to be permitted.

* * * * *